US011143401B2

(12) United States Patent
Moura et al.

(10) Patent No.: US 11,143,401 B2
(45) Date of Patent: Oct. 12, 2021

(54) APPARATUS AND METHOD FOR MITIGATING PARTICULATE ACCUMULATION ON A COMPONENT OF A GAS TURBINE

(71) Applicant: United Technologies Corporation, Farmington, CT (US)

(72) Inventors: Dennis M. Moura, South Windsor, CT (US); Carey Clum, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 161 days.

(21) Appl. No.: 16/226,874

(22) Filed: Dec. 20, 2018

(65) Prior Publication Data
US 2019/0195495 A1 Jun. 27, 2019

Related U.S. Application Data

(60) Provisional application No. 62/609,574, filed on Dec. 22, 2017.

(51) Int. Cl.
*F23R 3/00* (2006.01)
*F23M 5/08* (2006.01)
(Continued)

(52) U.S. Cl.
CPC .............. *F23R 3/002* (2013.01); *F02C 7/185* (2013.01); *F23M 5/08* (2013.01); *F23R 3/00* (2013.01);
(Continued)

(58) Field of Classification Search
CPC .... F23R 3/002; F23R 3/02; F23R 3/04; F23R 3/06; F23R 2900/00004;
(Continued)

(56) References Cited

U.S. PATENT DOCUMENTS

| 4,700,544 A | 10/1987 | Fucci |
| 9,989,254 B2 * | 6/2018 | Fadde ................... F23R 3/002 |

(Continued)

FOREIGN PATENT DOCUMENTS

| EP | 3012531 A1 | 4/2016 |
| GB | 2353589 A | 2/2001 |

(Continued)

OTHER PUBLICATIONS

The Extended European Search Report for Application No. 18215269. 4-1019; Report dated Feb. 22, 2019; Report Received Date: Feb. 22, 2019; 9 pages.

*Primary Examiner* — Arun Goyal
(74) *Attorney, Agent, or Firm* — Cantor Colburn LLP

(57) ABSTRACT

A gas turbine engine component comprising: a first component having a receiving aperture extending; a second component having a first surface and a second surface; and a passageway portion including a first end, a second end opposite the first end, and an outer surface extending from the second end to the first end, the passageway portion extending from the second surface of the second component through the receiving aperture of the first component, wherein the outer surface of the passageway portion and the first component define a gap therebetween, the gap fluidly connecting airflow in an airflow path proximate the second surface of the first component to the cooling channel, wherein the gap is configured to direct the airflow along the outer surface and the outer surface is shaped to redirect the airflow in a lateral direction parallel to the second surface such that a lateral airflow is generated.

11 Claims, 5 Drawing Sheets

(51) Int. Cl.
*F02C 7/18* (2006.01)
*F23R 3/06* (2006.01)
*F23R 3/04* (2006.01)

(52) U.S. Cl.
CPC ............... *F23R 3/045* (2013.01); *F23R 3/06* (2013.01); *F05D 2240/35* (2013.01); *F05D 2260/201* (2013.01); *F05D 2260/607* (2013.01); *F23R 2900/00004* (2013.01); *F23R 2900/03044* (2013.01)

(58) Field of Classification Search
CPC .. F23R 2900/03042; F23R 2900/03043; F23R 2900/03044; F05D 2240/35; F05D 2260/201; F05D 2260/202; F05D 2260/203; F05D 2260/204; F05D 2260/205; F05D 2260/221; F05D 2260/2212; F05D 2260/2214; F05D 2260/22141; F05D 2260/231; F05D 2260/232; F05D 2260/607; F02C 7/05; F02C 7/052

See application file for complete search history.

(56) References Cited

U.S. PATENT DOCUMENTS

2010/0212324 A1* 8/2010 Bronson .................. F23R 3/06
60/752
2016/0238253 A1 8/2016 Moura et al.
2016/0305663 A1 10/2016 Lebel

FOREIGN PATENT DOCUMENTS

WO 2015039074 A1 3/2015
WO 2015085080 A1 6/2015

* cited by examiner

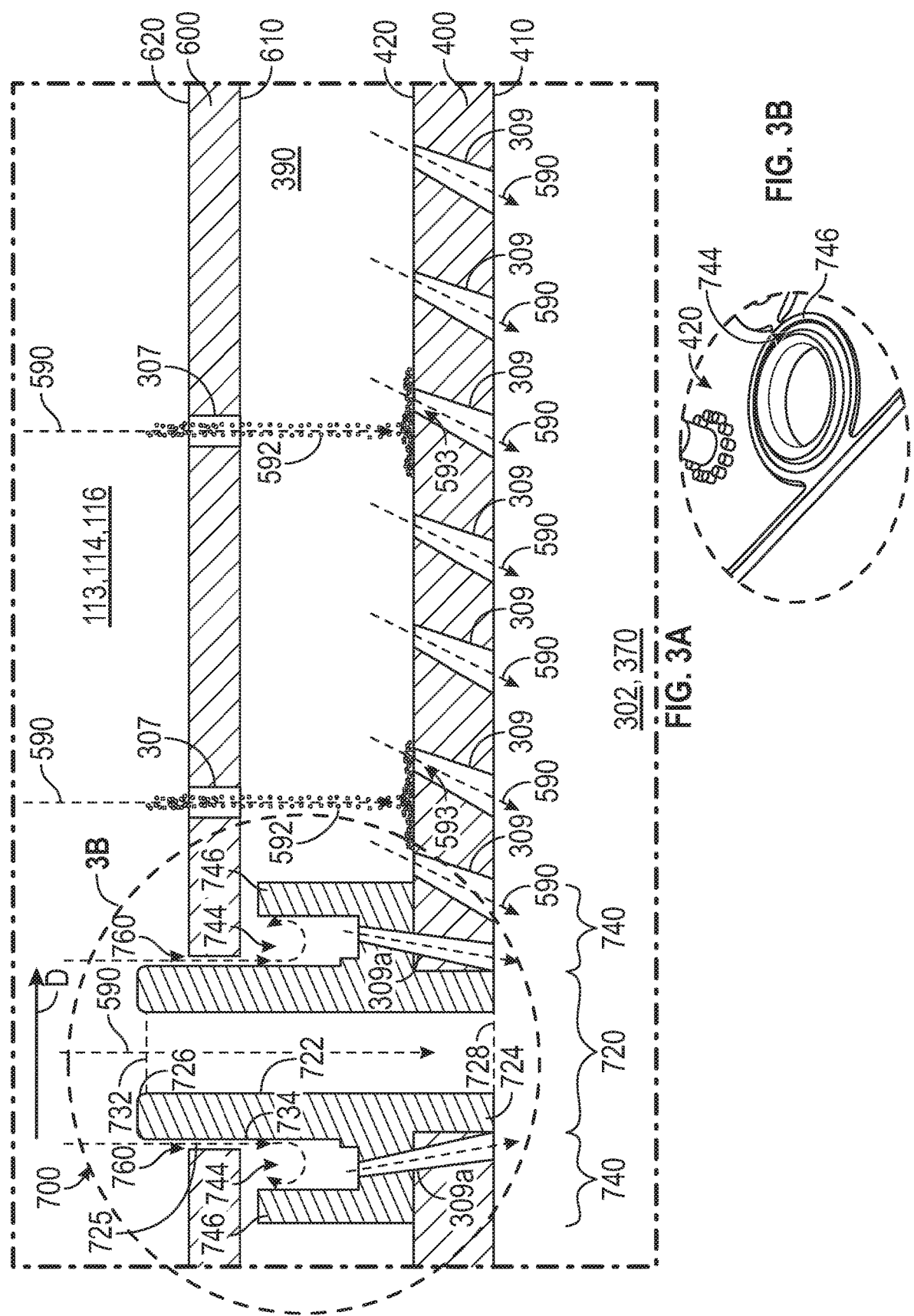

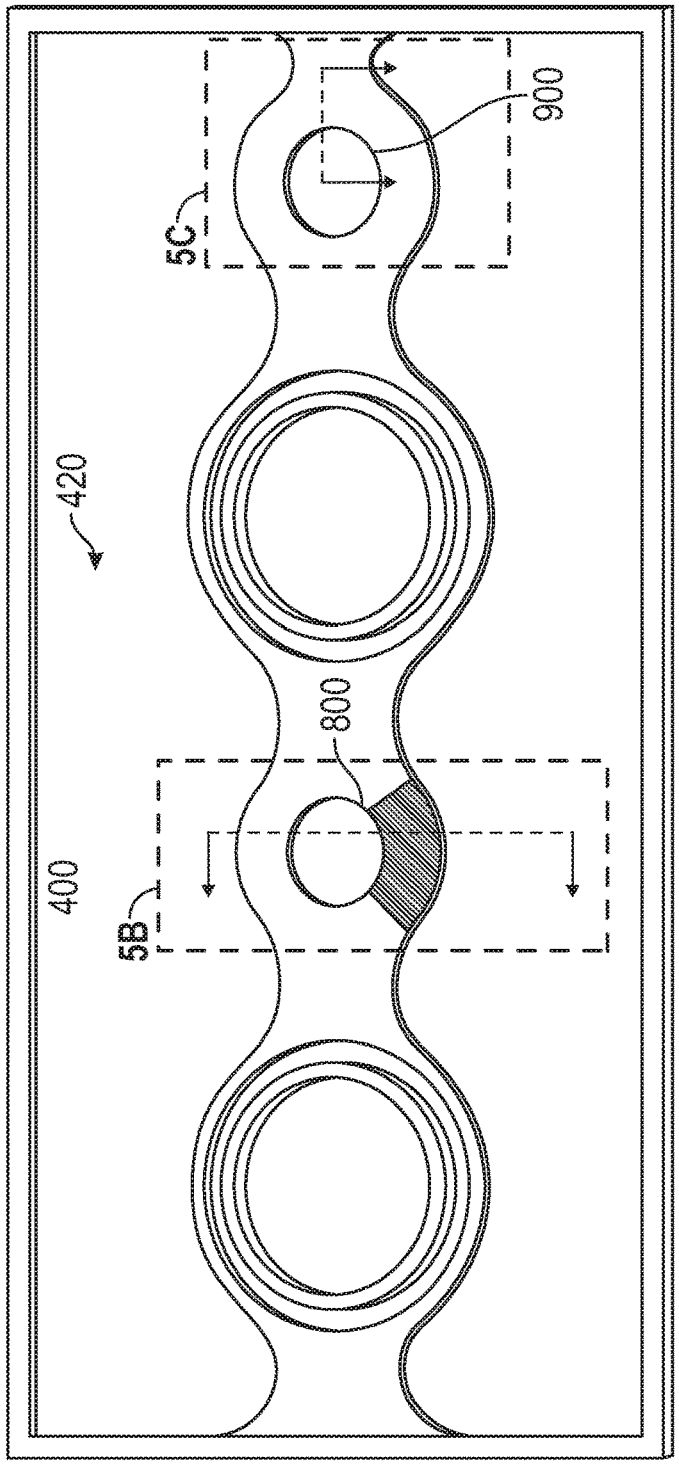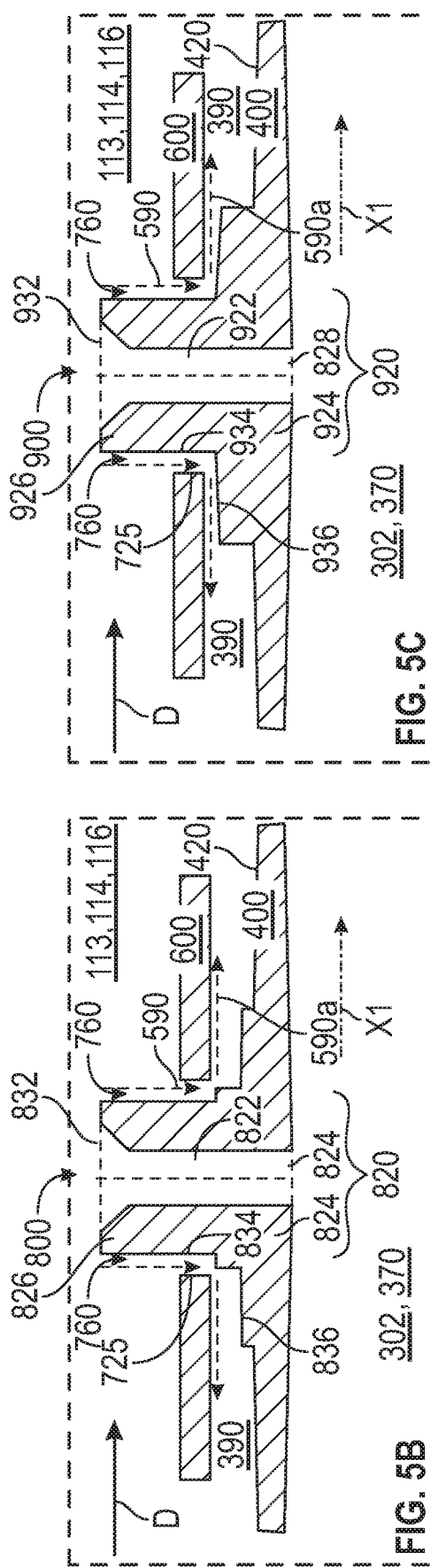

APPARATUS AND METHOD FOR MITIGATING PARTICULATE ACCUMULATION ON A COMPONENT OF A GAS TURBINE

CROSS-REFERENCE TO RELATED APPLICATIONS

This application claims the benefit of U.S. Provisional Application No. 62/609,574 filed Dec. 22, 2017, which is incorporated herein by reference in its entirety.

BACKGROUND

The subject matter disclosed herein generally relates to gas turbine engines and, more particularly, to a method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand and dirt.

SUMMARY

According to one embodiment, a gas turbine engine component assembly is provided. The gas turbine engine component comprising: a first component having a first surface, a second surface opposite the first surface, a cooling hole extending from the second surface to the first surface through the first component, and a receiving aperture extending from the second surface to the first surface through the first component; a second component having a first surface and a second surface, the first surface of the first component and the second surface of the second component defining cooling channel therebetween in fluid communication with the cooling hole for cooling the second surface of the second component; and a passageway portion including a first end, a second end opposite the first end, and an outer surface extending from the second end to the first end, the passageway portion extending from the second surface of the second component through the cooling channel and through the receiving aperture of the first component, wherein the outer surface of the passageway portion and the first component define a gap therebetween, the gap fluidly connecting airflow in an airflow path proximate the second surface of the first component to the cooling channel, wherein the gap is configured to direct the airflow along the outer surface of the passageway portion and the outer surface of the passageway portion is shaped to redirect the airflow in a lateral direction parallel to the second surface of the second component such that a lateral airflow is generated in the cooling channel.

In addition to one or more of the features described above, or as an alternative, further embodiments may include that the passageway portion is tubular in shape.

In addition to one or more of the features described above, or as an alternative, further embodiments may include that the passageway portion includes a passageway enclosed with the passageway portion, the passageway fluidly connecting the airflow in the flow path proximate the second surface of the first component to a chamber located proximate the first surface of the second component.

In addition to one or more of the features described above, or as an alternative, further embodiments may include: an intermittent circumferential ring located in the cooling channel and partially circumferentially surrounding the outer surface of the passageway portion, wherein the intermittent circumferential ring is configured to direct the lateral airflow in a selected lateral direction.

In addition to one or more of the features described above, or as an alternative, further embodiments may include that the intermittent circumferential ring extends from the second surface of the second component to proximate the first surface of the first component.

In addition to one or more of the features described above, or as an alternative, further embodiments may include that the second component further includes cooling holes fluidly connecting the cooling channel to a chamber located proximate the first surface of the second component.

In addition to one or more of the features described above, or as an alternative, further embodiments may include: a flat portion of the outer surface of the passageway portion, the flat portion oriented parallel with the second surface of the second component within the cooling channel.

In addition to one or more of the features described above, or as an alternative, further embodiments may include that the flat portion is oriented perpendicular to the gap.

In addition to one or more of the features described above, or as an alternative, further embodiments may include: a flat portion of the outer surface is oriented parallel with the second surface of the second component within the cooling channel, wherein the flat portion is located radially inward of the intermittent circumferential ring.

In addition to one or more of the features described above, or as an alternative, further embodiments may include that the flat portion is oriented perpendicular to the gap.

According to another embodiment, a combustor for use in a gas turbine engine is provided. The combustor enclosing a combustion chamber having a combustion area, wherein the combustor comprises: a combustion liner having an inner surface and an outer surface opposite the inner surface wherein the combustion liner includes a primary aperture extending from the outer surface to the inner surface through the combustion liner and a receiving aperture extending from the outer surface to the inner surface through the combustion liner; a heat shield panel interposed between the inner surface of the liner and the combustion area, the heat shield panel having a first surface and a second surface opposite the first surface, wherein the second surface is oriented towards the inner surface, and wherein the heat shield panel is separated from the liner by an impingement cavity; and a passageway portion including a first end, a second end opposite the first end, and an outer surface extending from the second end to the first end, the passageway portion extending from the second surface of the heat shield panel through the impingement cavity and through the receiving aperture of the combustion liner, wherein the outer surface of the passageway portion and the combustion liner define a gap therebetween, the gap fluidly connecting airflow in an airflow path proximate the outer surface of the combustion liner to the impingement cavity, wherein the gap is configured to direct the airflow along the outer surface of the passageway portion and the outer surface of the passageway portion is shaped to redirect the airflow in a lateral direction parallel to the second surface of the heat shield panel such that a lateral airflow is generated in the impingement cavity.

In addition to one or more of the features described above, or as an alternative, further embodiments may include that the passageway portion is tubular in shape.

In addition to one or more of the features described above, or as an alternative, further embodiments may include that the passageway portion includes a passageway enclosed with the passageway portion, the passageway fluidly connecting the airflow in the flow path proximate the outer surface of the combustion liner to the combustion area.

In addition to one or more of the features described above, or as an alternative, further embodiments may include: an intermittent circumferential ring located in the impingement cavity and partially circumferentially surrounding the outer surface of the passageway portion, wherein the intermittent circumferential ring is configured to direct the lateral airflow in a selected lateral direction.

In addition to one or more of the features described above, or as an alternative, further embodiments may include that the intermittent circumferential ring extends from the second surface of the heat shield panel to proximate the inner surface of the combustion liner.

In addition to one or more of the features described above, or as an alternative, further embodiments may include that the heat shield panel further includes secondary apertures fluidly connecting the impingement cavity to the combustion area.

In addition to one or more of the features described above, or as an alternative, further embodiments may include: a flat portion of the outer surface of the passageway portion, the flat portion oriented parallel with the outer surface of the heat shield panel within the impingement cavity.

In addition to one or more of the features described above, or as an alternative, further embodiments may include that the flat portion is oriented perpendicular to the gap.

In addition to one or more of the features described above, or as an alternative, further embodiments may include: a flat portion of the outer surface of the passageway portion is oriented parallel with the second surface of the heat shield panel within the impingement cavity, wherein the flat portion is located radially inward of the intermittent circumferential ring.

According to another embodiment, a grommet of a combustor for use in a gas turbine engine is provided. The grommet comprising: a passageway portion attached to a heat shield panel, the passageway portion extending towards a combustor liner opposite the heat shield panel and defining a passageway for introducing air to the combustor; and a channel portion surrounding the boss and adapted to receive the combustion liner, wherein the channel portion has at least one cut-out to introduce a cross flow into the an impingement cavity defined between the combustion liner and the heat shield panel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 3A is an enlarged cross-sectional illustration of a heat shield panel, combustion liner, and a quench hole of a combustor, in accordance with an embodiment of the disclosure;

FIG. 3B is an enlarged three-dimensional view illustration of a heat shield panel and a quench hole of a combustor, in accordance with an embodiment of the disclosure;

FIG. 5A is an enlarged three-dimensional view illustration of a heat shield panel and multiple cooling holes of a combustor, in accordance with an embodiment of the disclosure;

FIG. 5B is an enlarged cross-sectional illustration of a heat shield panel, combustion liner, and a quench hole of a combustor, in accordance with an embodiment of the disclosure; and FIG. 5C is an enlarged cross-sectional illustration of a heat shield panel, combustion liner, and a quench hole of a combustor, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor.

The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
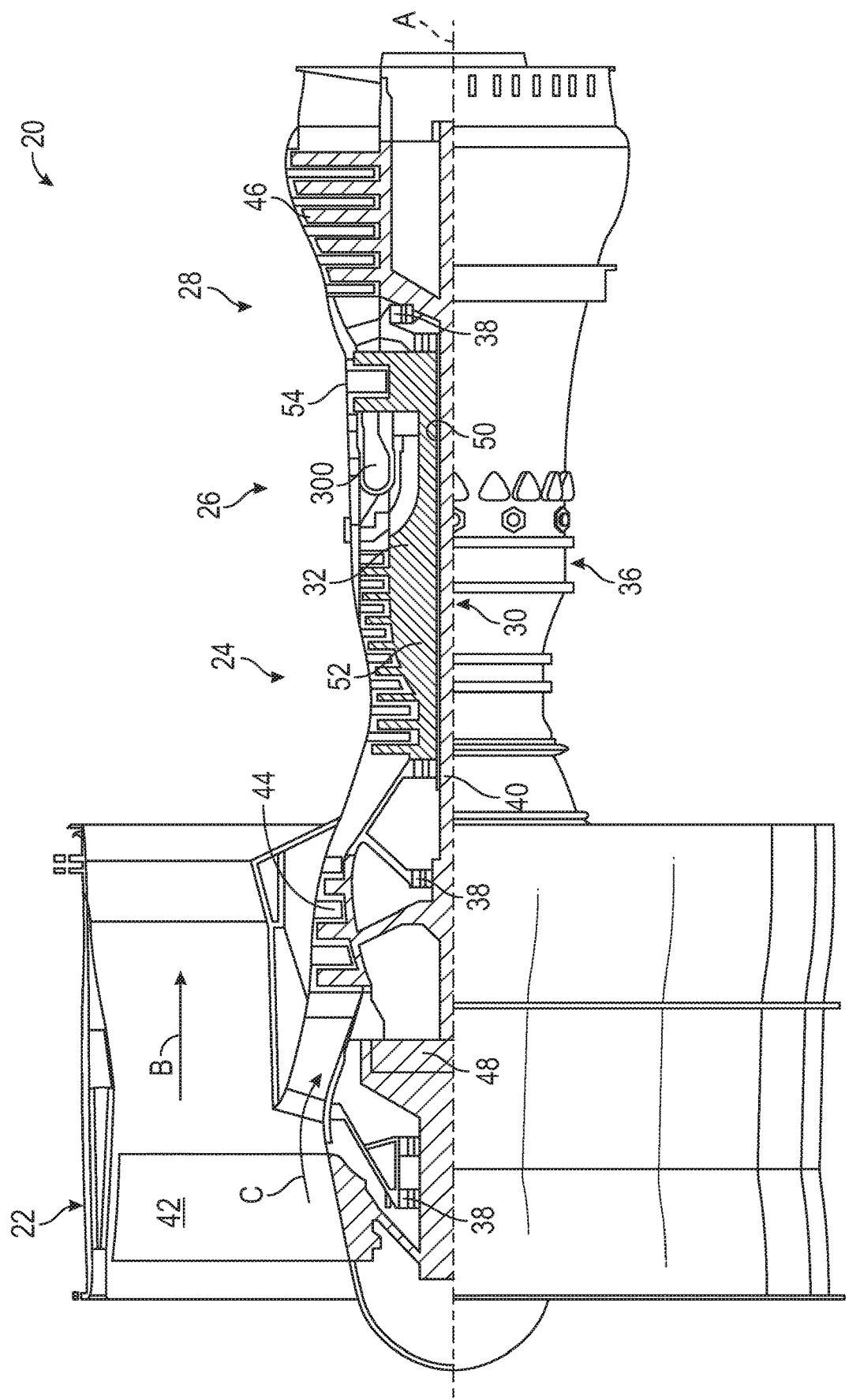
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2A:
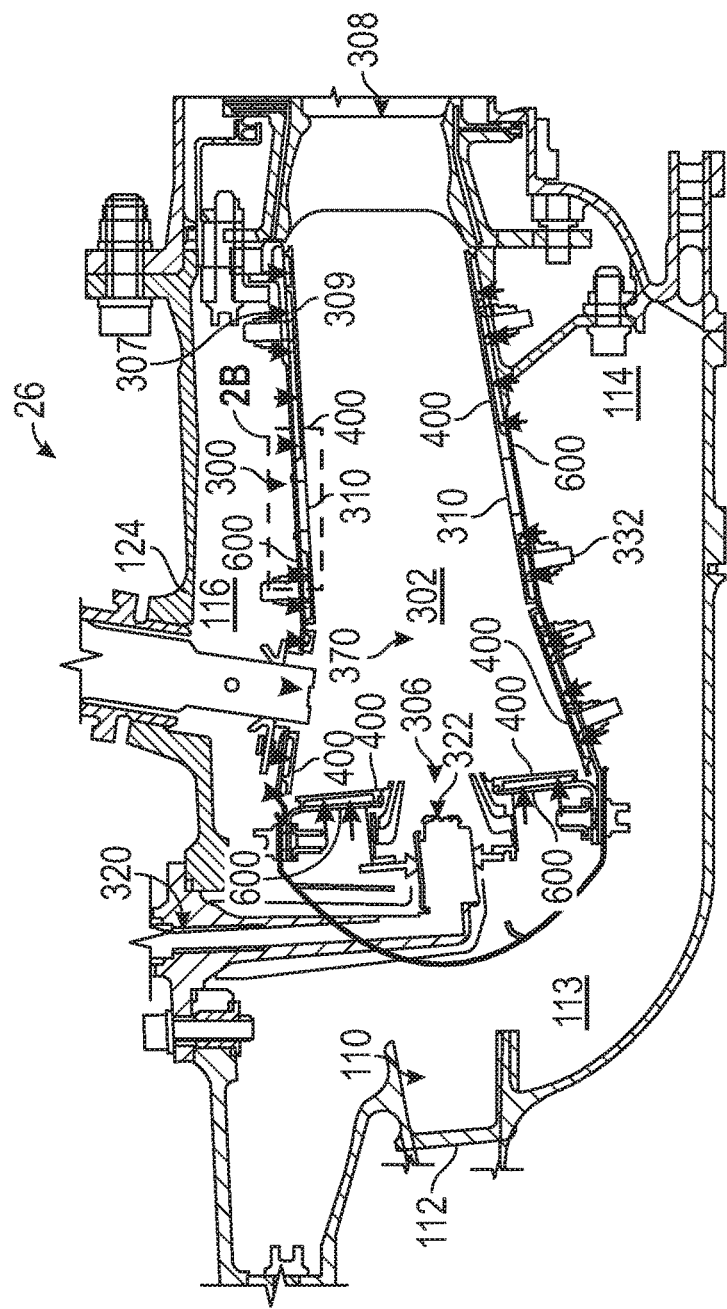
FIG. 2A is a cross-sectional illustration of a combustor, in accordance with an embodiment of the disclosure.
Figure 2B:
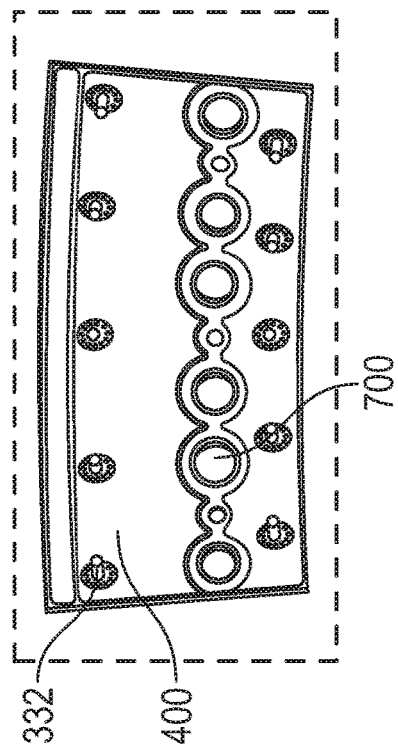
FIG. 2B is an enlarged illustration of quench holes of a combustor, in accordance with an embodiment of the disclosure.

Referring now to FIGS. 2A-B and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 700, as seen in FIGS. 2A-B.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

The combustor 300, as shown in FIG. 2A, includes multiple heat shield panels 400 that are attached to the combustion liner 600 (See FIG. 3A). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partially enclose a combustion area 370 within the combustion chamber 302 of the combustor 300.

Referring now to FIGS. 3A-B and 4A-B, with continued reference to FIGS. 1 and 2A-B. FIG. 3A illustrates a heat shield panel 400, combustion liner 600 of a combustor 300 (see FIG. 1) of a gas turbine engine 20 (see FIG. 1), and a quench hole 700 to attached the heat shield panel 400 to the combustion liner 600. The heat shield panel 400 and the combustion liner 600 are in a facing spaced relationship. The quench hole 700 is a cooling hole to provide cooled air to the combustion area 370 of the combustion chamber 302. The heat shield panel 400 includes a first surface 410 oriented towards the combustion area 370 of the combustion chamber 302 and a second surface 420 first surface opposite the first surface 410 oriented towards the combustion liner 600. The combustion liner 600 is having an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 extend from the outer surface 620 to the inner surface 610 through the combustion liner 600.

Each of the primary apertures 307 fluidly connects the impingement cavity 390 to at least one of the inner diameter branch 114 and the outer diameter branch 116. The heat shield panel 400 may include one or more secondary apertures 309 configured to allow airflow 590 from the impingement cavity 390 to the combustion area 370 combustion chamber 302.

Each of the secondary apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3A, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3A. Particulate 592 collecting upon the second surface 420 of the heat shield panel 400 reduces the cooling efficiency of airflow 590 impinging upon the second surface 420 and thus may increase local temperatures of the heat shield panel 400 and the combustion liner 600. Particulate 592 collection upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage.

A conventional quench hole 700 is also illustrated in FIGS. 3A-B. The quench hole 700 includes a passageway portion 720 and a channel portion 740. The passageway portion 720 and the channel portion 740 may be referred to together as a grommet. Although illustrated as a separate attachment to the heat shield panel 400 in FIGS. 3A-B and 4A-B, the passageway portion 720 and the channel portion 740 may be integrally formed from the heat shield panel 400. In FIG. 3A, the passageway portion 720 extends from the first surface 410 of the heat shield panel 400 through the impingement cavity 390 through a receiving aperture 725 of the combustion liner 600. A gap 760 exists between an outer surface 734 of the passageway portion 720 and the receiving aperture 725. The passageway portion 720 includes a first end 724 and a second end 726 opposite the first end 724. The first end 724 is located proximate heat shield panel 400. An outlet 728 is located at the first end 724. The outer surface 734 extends from the second end 726 to the first end 724 proximate the heat shield panel 400. The outer surface 734 stretches across the passageway portion 720 and the channel portion 710. A passageway 722 of the passageway portion 720 fluidly connects the combustion area 370 to the shroud chamber 113, the inner diameter branch 114, and/or the outer diameter branch 116. The passageway 722 is fluidly connected to the combustions chamber 302 through the outlet 728.

The passageway portion 720 of the quench hole 700 conveys airflow 590 in an airflow path D proximate the outer surface 620 of the combustion liner 600 directly to the combustion area 370. The second end 726 includes an outlet 732 and the outlet is located in the airflow path D. The outlet 732 fluidly connects the passageway 722 to airflow 590 in the airflow path D. Airflow 590 in the airflow path D may originate from the shroud chamber 113, the inner diameter branch 114, and/or the outer diameter branch 116, as described above. The passageway portion 720 passes through the impingement cavity 390 but does not fluidly connect to the impingement cavity 390. As illustrated in FIG. 3A, the passageway portion 720 may be tubal in shape.

The channel portion 740 fluidly connects the impingement cavity 390 to the shroud chamber 113, the inner diameter branch 114, and/or the outer diameter branch 116. The channel portion 740 of the quench hole 700 conveys airflow 590 in an airflow path D proximate the outer surface 620 of the combustion liner 600 into the channel 744 and then through a dedicated secondary aperture 309a into the combustion area 370. The dedicated aperture 309a fluidly connects the channel 744 to the combustion area 370. Airflow 590 in the airflow path D may originate from the shroud chamber 113, the inner diameter branch 114, and/or the outer diameter branch 116, as described above. The channel portion 720 includes an outer circumferential ring 746 configured to seal against the inward surface of the combustion liner 600 in order to prevent air leakage from the channel 744 to the impingement cavity 390. As illustrated in FIG. 3A, the channel portion 740 may be tubal in shape and located radially outward from the passageway portion 720. The outer circumferential ring 746 is located radially outward from the passageway portion 720 and the channel 744 is created therebetween. Airflow 590 is conveyed to the channel 744 through a gap 760 that exists between the outer surface 734 of the passageway portion 720 and the combustion liner 600 at the receiving aperture 725. The size of the gap 760 may varied to produce a desired pressure drop to obtain a desired amount of airflow 590 through the gap 760 in order to generate a desired lateral airflow 590a in the impingement cavity. The size of the gap 760 may be increased and/or decreased.

Figures 4A, 4B:
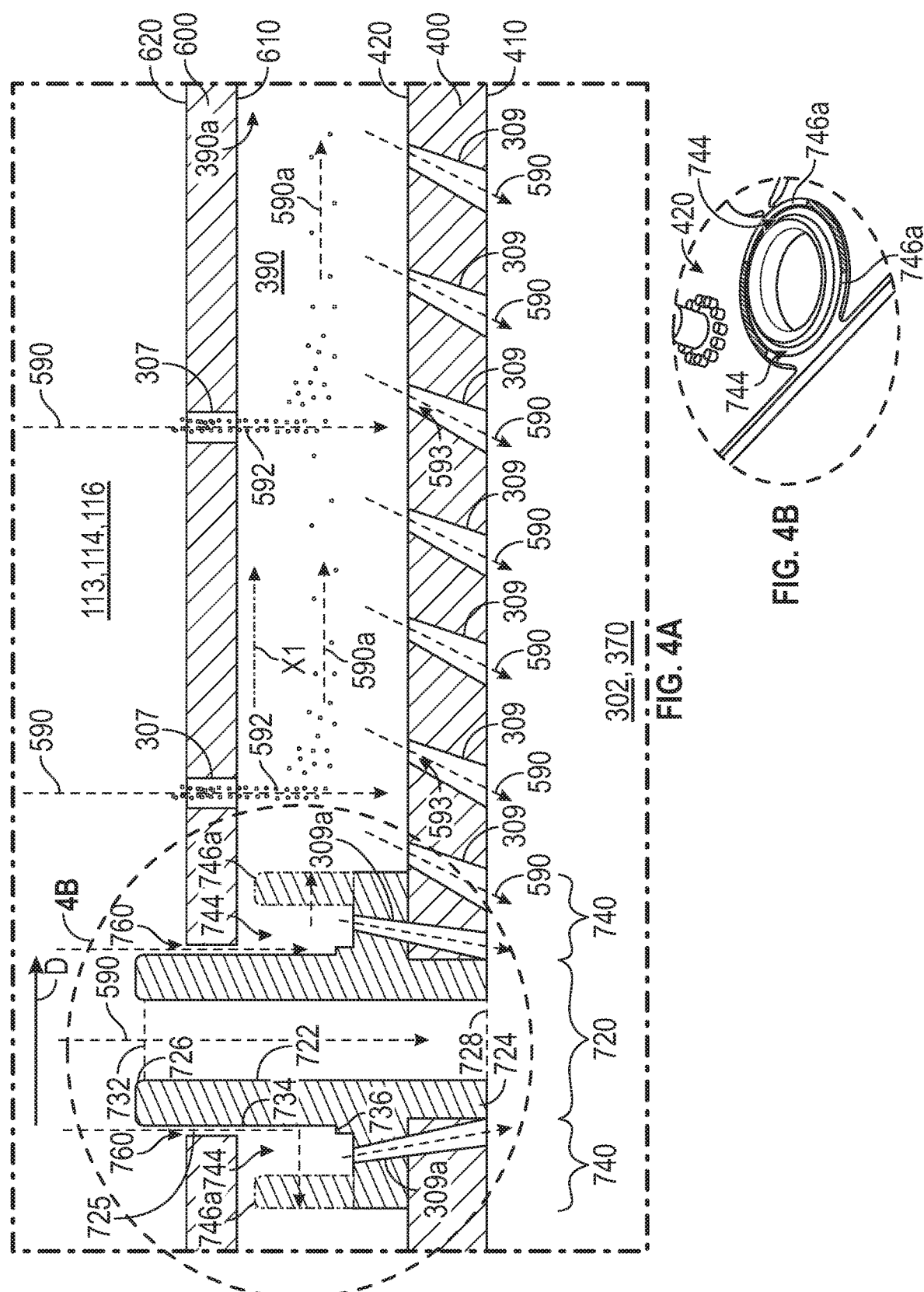
FIG. 4A is an enlarged cross-sectional illustration of a heat shield panel, combustion liner, and a quench hole of a combustor, in accordance with an embodiment of the disclosure.
FIG. 4B is an enlarged three-dimensional view illustration of a heat shield panel and a quench hole of a combustor, in accordance with an embodiment of the disclosure.

A different configuration of a quench hole 700 is illustrated in FIGS. 4A-B, in accordance with an embodiment of the present disclosure. The quench hole 700 includes a passageway portion 720 and a channel portion 740 but the circumferential ring 746 is partially removed in selected locations, thus creating an intermittent circumferential ring 746a. The intermittent circumferential ring 746a only partially circumferentially surrounds the passageway portion 720 (i.e. there are cut-outs in the intermittent circumferential ring 746a), thus creating an incomplete seal with the inner surface 610 of the combustion liner 600, which allows airflow 590 from the channel 744 to be flow into the impingement cavity 390. Advantageously, since the circumferential ring 746 only partially circumferentially surrounds the passageway portion 720, when the air leaves the channel 744 and flows into the impingement cavity 390 a lateral airflow 590a is generated thus promoting lateral movement of particulate 592 through the impingement cavity 390, thus reducing the amount of particulate 592 collecting on the second surface 420 of the heat shield panel 400, as seen in FIG. 4A. Also advantageously, if the impingement cavity 390 includes an exit 390a, since the circumferential ring 746 only partially circumferentially surrounds the passageway portion 720, when the air leaves the channel 744 and flows into the impingement cavity 390 a lateral airflow 590a is generated thus promoting lateral movement of particulate 592 through the impingement cavity 390 and towards the exit 390a of the impingement cavity 390.

In FIG. 4A, the passageway portion 720 extends from the first surface 410 of the heat shield panel 400 through the impingement cavity 390 through a receiving aperture 725 of the combustion liner 600. A gap 760 exists between an outer surface 734 of the passageway portion 720 and the receiving aperture 725. The passageway portion 720 includes a first end 724 and a second end 726 opposite the first end 724. The first end 724 is located proximate heat shield panel 400. An outlet 728 is located at the first end 724. The outer surface 734 extends from the second end 726 to first end 724 proximate the heat shield panel 400. The outer surface 734 stretches across the passageway portion 720 and the channel portion 710. A passageway 722 of the passageway portion 720 fluidly connects the combustion area 370 to the shroud chamber 113, the inner diameter branch 114, and/or the outer diameter branch 116. The passageway portion 720 of the quench hole 700 conveys airflow 590 in an airflow path D proximate the outer surface 620 of the combustion liner 600 directly to the combustion area 370. The second end 726 includes an outlet 732 and the outlet is located in the airflow path D. The outlet 732 fluidly connects the passageway 722 to airflow 590 in the airflow path D. Airflow 590 in the airflow path D may originate from the shroud chamber 113, the inner diameter branch 114, and/or the outer diameter branch 116, as described above. The passageway portion 720 passes through the impingement cavity 390 but does not fluidly connect to the impingement cavity 390. As illustrated in FIG. 3B, the passageway portion 720 may be tubal in shape.

In FIG. 4A, the channel portion 740 fluidly connects the impingement cavity 390 to the shroud chamber 113, the inner diameter branch 114, and/or the outer diameter branch 116. The channel portion 740 of the quench hole 700 conveys airflow 590 in an airflow path D proximate the outer surface 620 of the combustion liner 600 into the channel 744 and then through a dedicated secondary aperture 309a into the combustion area 370. The dedicated aperture 309a fluidly connects the channel 744 to the combustion area 370. Airflow 590 in the airflow path D may originate from the shroud chamber 113, the inner diameter branch 114, and/or the outer diameter branch 116, as described above. The channel portion 720 includes an intermittent outer circumferential ring 746a configured to partially seal against the inward surface of the combustion liner 600 in order to prevent air leakage from the channel 744 to the impingement cavity 390 in particular directions. Advantageously, through utilization of an intermittent outer circumferential ring 726, the airflow 590 leakage into the impingement cavity 390 may be directed in a selected direction. As illustrated in FIG. 4A, the channel portion 740 may be tubal in shape and located radially outward from the passageway portion 720. The outer intermittent circumferential ring 746a is located radially outward from the passageway portion 720 and the channel 744 is created therebetween. Airflow 590 is conveyed to the channel 744 through a gap 760 that exists between the outer surface 734 of the passageway portion 720 and the combustion liner 600 at the receiving aperture 725. The size of the gap 760 may varied to produce a desired pressure drop to obtain a desired amount of airflow 590 through the gap 760 in order to generate a desired lateral airflow 590a in the impingement cavity. The size of the gap 760 may be increased and/or decreased. The gap 760 is configured to direct the airflow 590 along the outer surface 734 of the passageway portion 720 and the outer surface 734 is shaped to redirect the airflow 590 in about a lateral direction X1 such that a cross flow 590a is generated in the impingement cavity 390. As shown in FIG. 4A, the outer surface 734 may include a flat portion 736 oriented about parallel with the second surface 420 of the heat shield panel 400 within the impingement cavity 390. The flat portion 736 is configured to redirect the airflow 590 in about a lateral direction X1 such that a cross flow 590a is generated in the impingement cavity 390. The flat portion 736 is located radially inward of the intermittent circumferential ring 746a.

As illustrated in FIG. 5A-C, additional cooling holes 800, 900 may exist in the heat shield panel 400. These cooling holes 800, 900 include a passageway portion 820, 920 but do not include a channel portion 740 as described above in reference to FIGS. 3A-B and 4A-B. The passageway portion 820, 920 extends from the first surface 410 of the heat shield panel 400 through the impingement cavity 390 through a receiving aperture 725 of the combustion liner 600. A gap 760 exists between an outer surface 834, 934 of the passageway portion 820, 920 and the receiving aperture 725. The passageway portion 820, 920 includes a first end 824, 924 and a second end 826, 926 opposite the first end 824, 924. The first end 824, 924 is located proximate heat shield panel 400. An outlet 828, 928 is located at the first end 824, 924. The outer surface 834, 934 extends from the second end 826, 926 to the first end 824, 924 proximate the heat shield panel 400. A passageway 822, 922 of the passageway portion 820, 920 fluidly connects the combustion area 370 to the shroud chamber 113, the inner diameter branch 114, and/or the outer diameter branch 116. The passageway portion 820, 920 of the cooling holes 800, 900 conveys airflow 590 in an airflow path D proximate the outer surface 620 of the combustion liner 600 directly to the combustion area 370.

The second end 826, 926 includes an outlet 832, 932 and the outlet 832, 932 is located in the airflow path D. The outlet 832, 932 fluidly connects the passageway 822, 922 to airflow 590 in the airflow path D. Airflow 590 in the airflow path D may originate from the shroud chamber 113, the inner diameter branch 114, and/or the outer diameter branch 116, as described above. The passageway portion 820, 920 passes through the impingement cavity 390 but does not fluidly connect to the impingement cavity 390. As illustrated in FIG. 5B-5C, the passageway portion 820, 920 may be tubal in shape. Airflow 590 is conveyed to the impingement cavity 390 through a gap 760 that exists between the outer surface 834, 934 of the passageway portion 820, 920 and the combustion liner 600 at the receiving aperture 725. The size of the gap 760 may varied to produce a desired pressure drop to obtain a desired amount of airflow 590 through the gap 760 in order to generate a desired lateral airflow 590a in the impingement cavity. The size of the gap 760 may be increased and/or decreased. The gap 760 is configured to direct the airflow 590 along the outer surface 834, 934 of the passageway portion 820, 920 and the outer surface 834, 934 is shaped to redirect the airflow 590 in about a lateral direction X1 such that a cross flow 590a is generated in the impingement cavity 390. As shown in FIG. 5B-C, the outer surface 834, 934 may include a flat portion 836, 936 oriented about parallel with the second surface 420 of the heat shield panel 400 within the impingement cavity 390. The flat portion 836, 936 is configured to redirect the airflow 590 in about a lateral direction X1 such that a cross flow 590a is generated in the impingement cavity 390.

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The first component may have cooling holes similar to the primary orifices. The cooling holes may direct air through the cooling channel to impinge upon the second component.

Technical effects of embodiments of the present disclosure include incorporating directing airflow along a passageway portion of a cooling hole and redirecting the airflow laterally to introduce lateral airflow across a heat shield panel surrounding a combustion area of a combustion chamber to help reduce collection of particulates on the heat shield panel and also help to reduce entry of the particulate into the combustion area of a combustion chamber.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine component assembly, comprising:
a first component having an inner surface, an outer surface opposite the inner surface, a cooling hole extending from the outer surface to the inner surface through the first component, and a receiving aperture extending from the outer surface to the inner surface through the first component;
a second component having a first surface and a second surface, the inner surface of the first component and the second surface of the second component defining an impingement cavity therebetween in fluid communication with the cooling hole for cooling the second surface of the second component;
a passageway portion including a first end, a second end opposite the first end, and an radially outward surface extending from the second end to the first end, the passageway portion extending from the first surface of the second component through the impingement cavity and through the receiving aperture of the first component, wherein the radially outward surface and the first component define a gap therebetween, the gap fluidly connecting airflow in an airflow path proximate the outer surface of the first component to the impingement cavity, wherein the gap is configured to direct the airflow along the radially outward surface and the radially outward surface defining a flat shaped to redirect the airflow in a lateral direction parallel to the second surface of the second component such that a lateral airflow is generated in the impingement cavity;
an intermittent circumferential ring located in the impingement cavity and partially circumferentially surrounding the radially outward surface, wherein the intermittent circumferential ring defines a channel within the impingement cavity between the radially outward surface and the intermittent circumferential ring, wherein the intermittent circumferential ring includes cut-outs extending from a bottom of the channel to a top of the intermittent circumferential ring; and
wherein the flat portion of the radially outward surface is oriented parallel with the second surface of the second component, wherein the flat portion is located radially inward of the intermittent circumferential ring within the channel, wherein the flat portion is configured to redirect the airflow in the lateral direction parallel to the second surface and through the cut-outs into the impingement cavity radially outward of the intermittent circumferential ring to generate the lateral airflow in the impingement cavity.

2. The gas turbine engine component assembly of claim 1, wherein the passageway portion is tubular in shape.

3. The gas turbine engine component assembly of claim 2, wherein the passageway portion includes a passageway enclosed with the passageway portion, the passageway fluidly connecting the airflow in the airflow path proximate the outer surface of the first component to a combustion chamber located proximate the first surface of the second component.

4. The gas turbine engine component assembly of claim 1, wherein:
the intermittent circumferential ring extends from the second surface of the second component to proximate the inner surface of the first component.

5. The gas turbine engine component assembly of claim 1, wherein:
the second component further includes cooling holes fluidly connecting the impingement cavity to a combustion chamber located proximate the first surface of the second component.

6. A combustor for use in a gas turbine engine, the combustor enclosing a combustion chamber having a combustion area, wherein the combustor comprises:
a combustion liner having an inner surface and an outer surface opposite the inner surface wherein the combustion liner includes a primary aperture extending from the outer surface to the inner surface through the combustion liner and a receiving aperture extending from the outer surface to the inner surface through the combustion liner;
a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the combustion liner by an impingement cavity;
a passageway portion including a first end, a second end opposite the first end, and a radially outward surface extending from the second end to the first end, the passageway portion extending from the first surface of the heat shield panel through the impingement cavity and through the receiving aperture of the combustion liner, wherein the radially outward surface and the combustion liner define a gap therebetween, the gap fluidly connecting airflow in an airflow path proximate the outer surface of the combustion liner to the impingement cavity, wherein the gap is configured to direct the airflow along the radially outward surface and the radially outward surface defining a flat shaped to redirect the airflow in a lateral direction parallel to the second surface of the heat shield panel such that a lateral airflow is generated in the impingement cavity;
an intermittent circumferential ring located in the impingement cavity and partially circumferentially surrounding the radially outward surface, wherein the intermittent circumferential ring defines a channel within the impingement cavity between the radially outward surface and the intermittent circumferential ring, wherein the intermittent circumferential ring includes cut-outs extending from a bottom of the channel to a top of the intermittent circumferential ring; and wherein the flat portion of the radially outward surface oriented parallel with the second surface of the second component, wherein the flat portion is located radially inward of the intermittent circumferential ring within the channel, wherein the flat portion is configured to redirect the airflow in the lateral direction parallel to the second surface and through the cut-outs into the impingement cavity radially outward of the intermittent circumferential ring to generate the lateral airflow in the impingement cavity.

7. The combustor of claim 6, wherein the passageway portion is tubular in shape.

8. The combustor of claim 7, wherein the passageway portion includes a passageway enclosed with the passageway portion, the passageway fluidly connecting the airflow in the airflow path proximate the outer surface of the combustion liner to the combustion area.

9. The combustor of claim 6, wherein:
the intermittent circumferential ring extends from the second surface of the heat shield panel to proximate the inner surface of the combustion liner.

10. The combustor of claim 6, wherein:
the heat shield panel further includes secondary apertures fluidly connecting the impingement cavity to the combustion area.

11. A grommet of a combustor for use in a gas turbine engine, the grommet comprising:
a passageway portion attached to an inner surface of a heat shield panel, the inner surface facing a combustion chamber, the passageway portion extending from the inner surface through a combustor liner opposite the heat shield panel and defining a passageway for introducing air to the combustor;
a gap defined between a radially outward surface of the passageway portion and the combustor liner;
a channel portion surrounding the passageway portion and adapted to receive an airflow from proximate an outer surface of the combustion liner through the gap,
wherein the channel portion, defining a channel, has at least one cut-out to introduce a cross flow into an impingement cavity defined between the combustion liner and the heat shield panel,
wherein the channel portion includes an intermittent circumferential ring located in the impingement cavity and partially circumferentially surrounding the radially outward surface, and
wherein the intermittent circumferential ring defines the channel within the impingement cavity between the radially outward surface and the intermittent circumferential ring, wherein the intermittent circumferential ring includes the at least one cut-out extending from a bottom of the channel to a top of the intermittent circumferential ring; and
a flat portion of the radially outward surface that is oriented parallel with the second surface of the second component, wherein the flat portion is located radially inward of the intermittent circumferential ring within the channel, wherein the flat portion is configured to redirect the airflow in a lateral direction parallel to the second surface and through the at least one cut-out into the impingement cavity radially outward of the intermittent circumferential ring to generate a lateral airflow in the impingement cavity.

* * * * *